United States Patent [19]
White

[11] Patent Number: 6,023,488
[45] Date of Patent: *Feb. 8, 2000

[54] SPREAD SPECTRUM MODULATION

[75] Inventor: Peter John White, Figtree, Australia

[73] Assignee: Canon Kabushiki Kaisha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/854,455

[22] Filed: May 12, 1997

Related U.S. Application Data

[63] Continuation of application No. 08/535,384, Sep. 28, 1995, abandoned, which is a continuation of application No. 08/125,224, Sep. 23, 1993, abandoned.

[30] Foreign Application Priority Data

Sep. 24, 1992 [AU] Australia ................. PL 4939
Sep. 24, 1992 [AU] Australia ................. PL 4940

[51] Int. Cl.$^7$ ........................................ H04B 1/707
[52] U.S. Cl. ........................................ 375/206; 370/342
[58] Field of Search ...................... 375/200, 205, 375/206, 260, 367; 370/320, 335, 342, 441

[56] References Cited

U.S. PATENT DOCUMENTS

| | | | |
|---|---|---|---|
| 4,112,368 | 9/1978 | Ewanus et al. ................. | 375/200 |
| 4,334,322 | 6/1982 | Clark, III ................. | 375/1 X |
| 4,494,238 | 1/1985 | Groth, Jr. . | |
| 4,613,978 | 9/1986 | Kurth et al. . | |
| 5,029,184 | 7/1991 | Andren et al. ................. | 375/1 |
| 5,063,560 | 11/1991 | Yerbury et al. ................. | 370/335 |
| 5,105,435 | 4/1992 | Stilwell ................. | 375/1 |
| 5,177,767 | 1/1993 | Kato . | |
| 5,208,829 | 5/1993 | Soleimani et al. ................. | 375/1 |
| 5,241,561 | 8/1993 | Barnard ................. | 375/206 |
| 5,263,048 | 11/1993 | Wade ................. | 375/1 |
| 5,321,721 | 6/1994 | Yamaura et al. ................. | 375/205 |
| 5,488,632 | 1/1996 | Mason et al. ................. | 375/260 |

FOREIGN PATENT DOCUMENTS 0446024  9/1991  European Pat. Off. .

OTHER PUBLICATIONS

Sinnema, William, "Digital, Analog, and Data Communication", Reston Publishing Company, Inc., pp. 152–157, 1982.
IREECON 91—Australia S Electronics Conv. Proc., Sep. 16–20, 1991, pp. 428–431, Simington et al. "New Frequency Domain Techniques For DSP Based VSAT Modems".

*Primary Examiner*—Don N. Vo
*Attorney, Agent, or Firm*—Fitzpatrick, Cella, Harper & Scinto

[57] ABSTRACT

A spread spectrum modulation system uses an input signal and a spreading signal for modulating the input signal. The spreading signal includes a plurality of component signals spaced apart substantially equally in frequency and with substantially equal amplitudes. Each component signal is phase encoded by either having a phase assigned by a random or pseudo-random number generator or by reference to a look-up table. Interference in the spread spectrum system is reduced by detecting, in the received signal, a channel or channels in which interference is present. The parts of the de-spreading signal corresponding to the channel or channels having interference are discarded, so as to form a modified de-spreading signal. The received spread spectrum signal is then de-spread using the modified de-spreading signal.

26 Claims, 15 Drawing Sheets

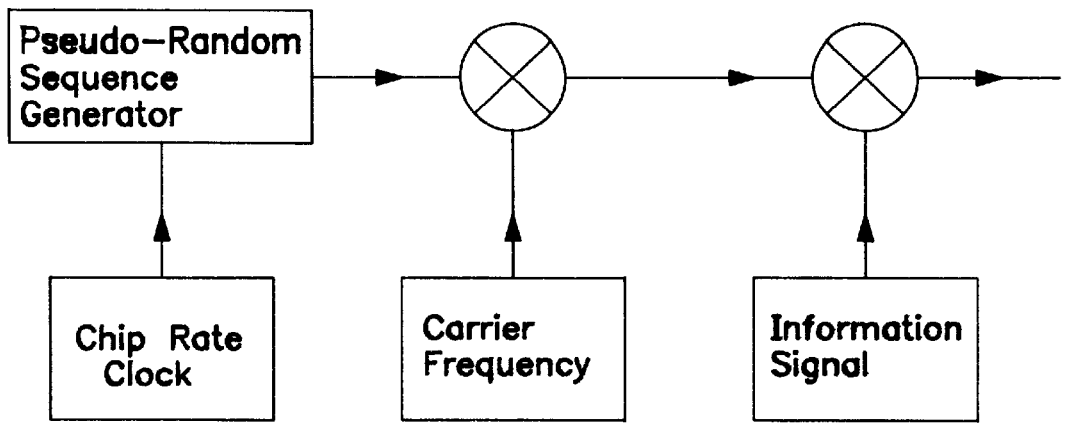
FIG. I(a)
PRIOR ART
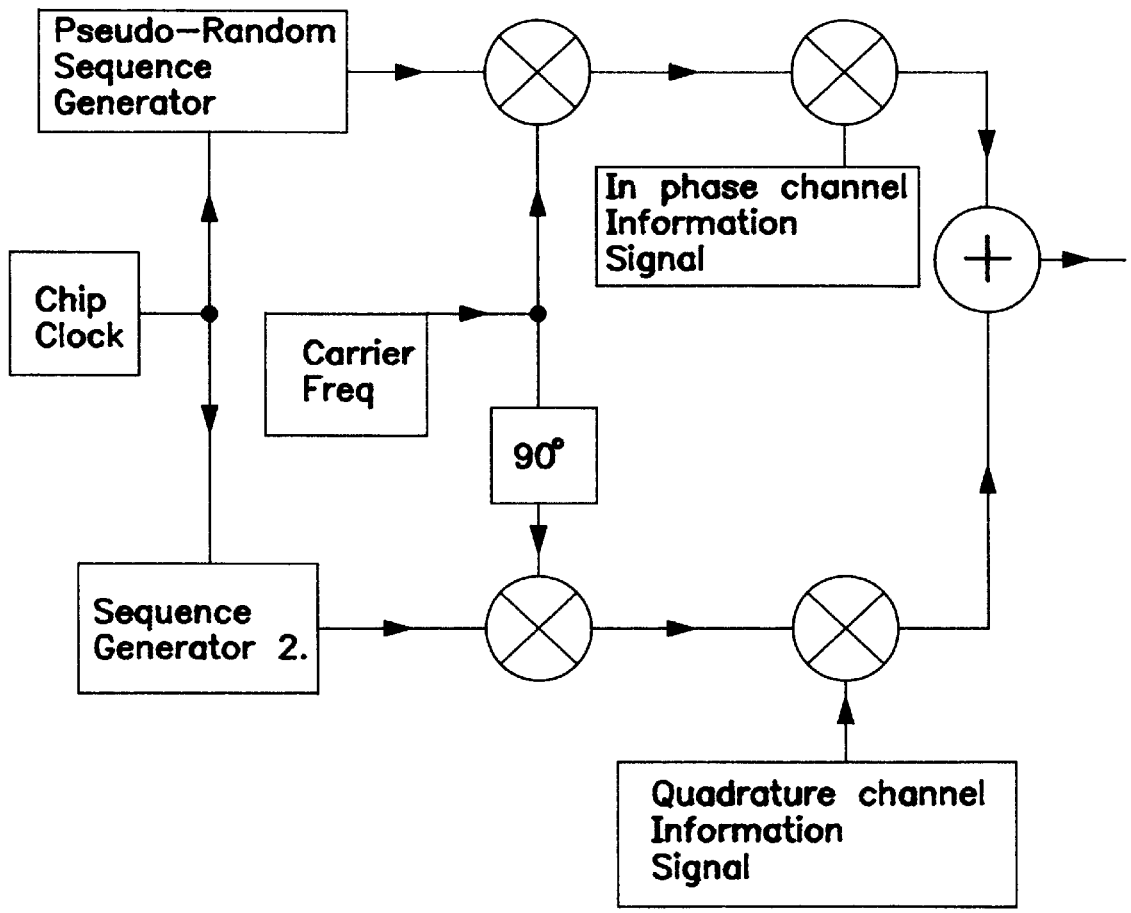
FIG. I(b)
PRIOR ART

|         | $f_c$ | $2f_c$ | $3f_c$ | $4f_c$ | $5f_c$ | $6f_c$ | $7f_c$ | $8f_c$ | $9f_c$ | $10f_c$ | $11f_c$ | $12f_c$ | $13f_c$ | $14f_c$ | $15f_c$ |
|---------|-----|------|------|------|------|------|------|------|------|-------|-------|-------|-------|-------|-------|
| Code 0  | -1  | -1   | -1   | -1   | -1   | +1   | +1   | +1   | +1   | +1    | -1    | -1    | +1    | -1    | +1    |
| Code 1  | +1  | +1   | -1   | -1   | +1   | +1   | +1   | -1   | +1   | +1    | +1    | -1    | -1    | -1    | -1    |
| Code 2  | -1  | +1   | +1   | -1   | -1   | -1   | +1   | +1   | -1   | -1    | +1    | +1    | -1    | +1    | +1    |
| Code 3  | +1  | -1   | -1   | -1   | -1   | -1   | -1   | +1   | +1   | +1    | -1    | +1    | +1    | -1    | -1    |
| ⋮       |     |      |      |      |      |      |      |      |      |       |       |       |       |       |       |
| Code 14 | -1  | -1   | -1   | +1   | +1   | -1   | -1   | +1   | +1   | -1    | -1    | -1    | -1    | +1    | -1    |

FIG. 8(a)

|         | $f_c$ | $2f_c$ | $3f_c$ | $4f_c$ | $5f_c$ | $6f_c$ | $7f_c$ | $8f_c$ | $9f_c$ | $10f_c$ | $11f_c$ | $12f_c$ | $13f_c$ | $14f_c$ | $15f_c$ | $16f_c$ |
|---------|-----|------|------|------|------|------|------|------|------|-------|-------|-------|-------|-------|-------|-------|
| Code 0  | -1  | -1   | -1   | -1   | +1   | +1   | -1   | -1   | -1   | +1    | -1    | +1    | +1    | -1    | +1    | +1    |
| Code 1  | +1  | +1   | -1   | -1   | +1   | +1   | +1   | +1   | -1   | +1    | +1    | -1    | -1    | +1    | -1    | +1    |
| Code 2  | -1  | +1   | +1   | -1   | -1   | -1   | +1   | -1   | -1   | -1    | +1    | -1    | -1    | +1    | +1    | +1    |
| Code 3  | +1  | -1   | -1   | -1   | -1   | -1   | +1   | +1   | +1   | +1    | +1    | +1    | -1    | -1    | -1    | +1    |
| ⋮       |     |      |      |      |      |      |      |      |      |       |       |       |       |       |       |       |
| Code 14 | -1  | -1   | -1   | +1   | +1   | -1   | -1   | +1   | +1   | -1    | +1    | -1    | -1    | +1    | -1    | +1    |

FIG. 8(b)

SPREAD SPECTRUM MODULATION

This application is a continuation of application Ser. No. 08/535,384 filed Sep. 28, 1995 which is now abandoned, which is a continuation of application Ser. No. 08/125,224 filed Sep. 23, 1993 now abandoned.

FIELD OF INVENTION

The present application relates to a modulation technique, particularly but not exclusively applicable to wireless local area network (LAN) applications.

BACKGROUND ART

The modern office environment utilises a wide variety of intelligent devices which communicate with each other over a variety of media. The most common arrangement, for both telephony and data network applications, uses cable connections to provide a transmission medium. This requires new cabling, connectors, etc every time a new device is connected to the network. It is accordingly desirable to provide a wireless office system.

A further difficulty is that the available parts of the radio spectrum are limited by government regulation. One approach to providing wireless services is to utilise the available spectrum and power levels within rules for operating emissions from electronic devices. One technique for doing this is to utilise spread spectrum techniques.

Spread-spectrum systems can generally be classified into two types:

*direct sequence spread spectrum
*frequency hopping spread spectrum

Combination of these types also exist.

The basic operation of a spread spectrum communications system is to take an information signal and spread it in frequency until it occupies a much larger bandwidth than the original information signal. The direct sequence system produces a continuous noise-like signal which contains energy at all frequencies in the spread bandwidth, whereas the frequency hopping system produces a burst signal on discrete frequencies within this band.

In a direct-sequence spread-spectrum system, the information signal is multiplied by the noise-like spreading signal which is a binary waveform. These spreading signals are typically derived from linear feedback shift registers. The binary waveforms consist of ideally random but more usually pseudo-random data at a rate (the chip rate) which is much higher than the information rate. Such a system is shown in prior art FIGS. 1(a) and 1(b).

The simple system in FIG. 1(a) requires a single sequence generator. More signals can be fitted into the same spreading bandwidth if the quadrature channel is utilised as shown in FIG. 1(b). This requires two sequence generators.

As the spectrum of random binary data has a sin(x)/x shape, this spectral shape is typical of spread spectrum systems using a binary data sequence as a spreading waveform. Often a band-limited signal is required, which generally necessitates either filtering of the spreading waveform, or filtering of the spread waveform, or a combination of these.

Some of the undesirable aspects of DS spread spectrum systems for these applications are:

* the spectrum is not flat;
* the spectrum is not band-limited;
* band-limiting the spectrum and/or flattening the spectrum requires filtering and can alter the cross-correlation properties of the codes. Special care is needed in the selection of the band pass filters and the demodulation process to preserve these properties.

Spread-spectrum receivers often have to contend with interference, much of which is narrow band. FIG. 10 shows the typical scenario of a receiver being presented with a composite signal consisting of the spread spectrum signal and a narrow band interferer. Conceptually it is easy to discriminate between the desired signal and a narrow band interfering signal simply on the basis of bandwidth. An observer using a spectrum analyser could easily discriminate between the wanted and unwanted signals in this case. However, modifying the receiver to only accept the wanted signal and to reduce the effect of the unwanted interferer is a more complex problem.

Various techniques have been proposed for reducing the effect of narrow band interference on spread-spectrum receivers, including placing an adaptive filter before the receiver, and performing the correlation in the frequency domain and removing the effects of the interference there. Neither of these techniques is currently feasible for implementation in low-power portable equipment.

U.S. Pat. No. 5,177,767 and U.S. patent application Ser. No. 967,153 filed on Oct. 27, 1992, relates to the application.

SUMMARY OF INVENTION

It is accordingly desirable to provide a spread spectrum modulation technique which is relatively simple to implement, while reducing or removing the disadvantages of prior art systems.

According to one aspect the present invention provides a spread spectrum modulation system, wherein input signals are spread using a waveform comprising a plurality of spaced substantially equal amplitude output signals, and each of said output signals is phase encoded.

Preferably the phases of the output signals are assigned using a random or pseudo-random number sequence.

Preferably the phase encoded waveform is generated by reference to a look up table.

According to a further aspect the present invention provides a spread spectrum transmitter method, comprising step for spreading an input waveform using a spreading waveform, said waveform comprising a plurality of spaced substantially equal amplitude signals, wherein each of said output signals is phase encoded.

Preferably said spreading waveform is generated by reference to a look up table.

Preferably the phases are assigned by reference to a random or pseudo-random sequence.

The present invention provides a new method of designing noise-like waveforms suitable for use in a SS system which we have called Frequency Comb Spread Spectrum (FCSS). The noise-like spreading waveforms preferably have the following characteristics:

(a) they are inherently band-limited;
 (b) their spectrum is constant over the desired band;
 (c) because of (a) their properties are unchanged over band-limited channels.

Sets of waveforms with low cross-correlations may be generated, allowing standard Code Division Multiple Access techniques to be used. Because the waveforms are band-limited, the cross-correlations remain low even if the waveforms are passed over a band-limited channel.

Unlike the generation of DS signals, where the noise-like signal is generated in the time domain, the FCSS signal is synthesised in the frequency domain.

It is another object of the present invention to provide a method of reducing the effect of narrow band interference on a spread-spectrum system. It is a further object to provide an implementation of such a system which is relatively cheap and consumes low power.

According to another aspect the present invention provides a method of reducing the effect of interference in a spread spectrum system, comprising the steps of:

detecting the channel or channels in which interference is present, discarding the parts of the de-spreading waveform corresponding to this channel or channels, so as to form a modified de-spreading waveform, and de-spreading the received signal using the modified de-spreading waveform.

BRIEF DESCRIPTION OF DRAWINGS

An illustrative embodiment of the invention will now be described with reference to the accompanying drawings, in which:

FIG. 1(a) is a schematic block diagram showing a prior art DSSS transmitter;

FIG. 1(b) is a schematic block diagram showing a prior art DSSS transmitter using quadrature;

FIG. 8(a) is a table showing the amplitudes of 15 comb lines for 15 different codes;

FIG. 8(b) is a table showing the amplitudes for 15 orthogonal waveforms using 16 comb lines and Hadamard sequences.

Preferred Embodiment: Assume that a SS system requires a spreading waveform of 10 ms period and the signal is to be spread over a 1.5 MHz bandwidth.

DS Solution: A suitable DS spreading signal is a length 15 Maximum Length Sequence (MLS). This could be generated by a 4-stage shift register with appropriate feedback. An appropriate chip rate is 1.5 MHz. The block diagram for a suitable modulator is shown in FIG. 2(a).

The shift-register sequence generator produces a binary sequence of length 15, thus the sequence of bits repeats every 15 bits. The spectrum of this sequence at point A of FIG. 2(a), whilst having a sin(x)/x envelope, actually consists of discrete spectral lines spaced each 100 kHz as shown in FIG. 2(b) (This is due to the fact that the sequence is periodic with period 10 ms, 100 kHz=1/10 ms).

Figure 2A:
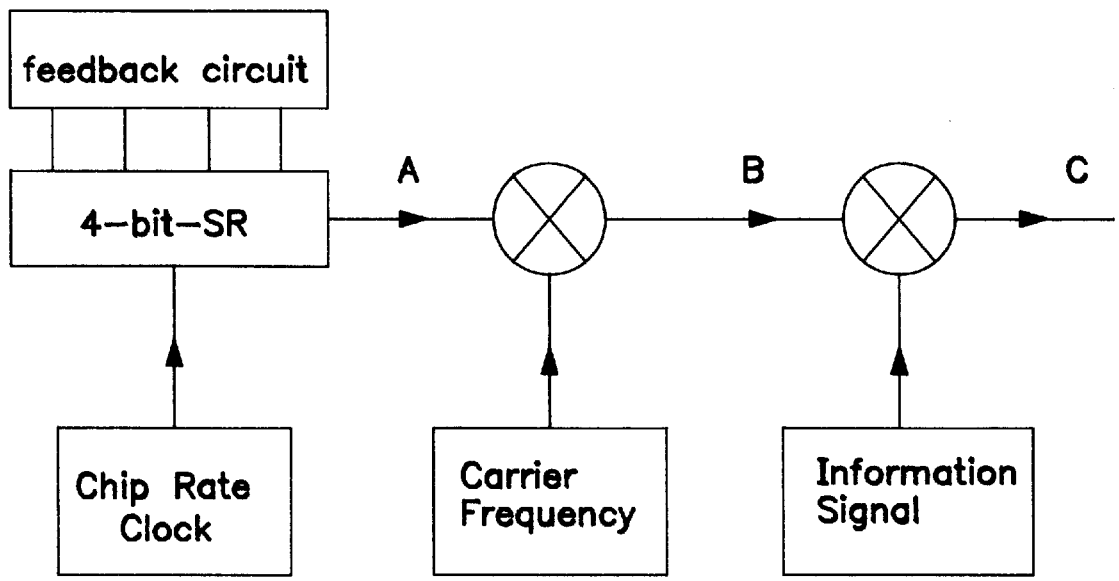
FIG. 2(a) is a schematic block diagram showing a prior art DSSS modulator.
Figure 2B:
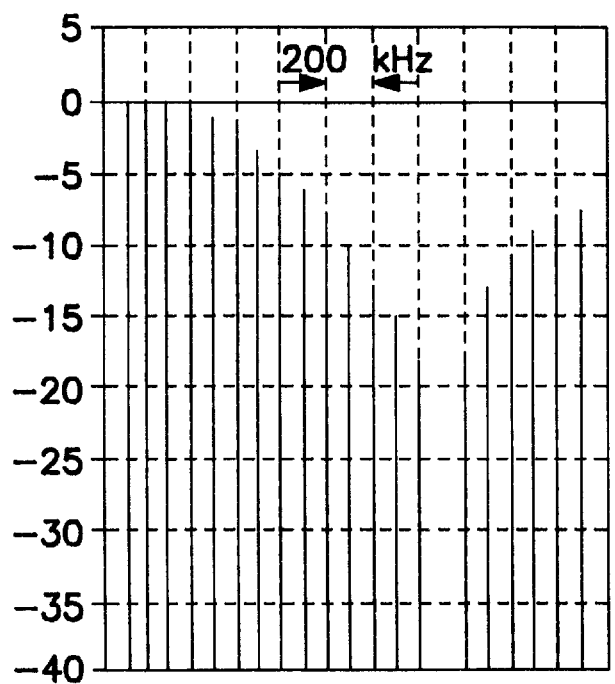
FIG. 2(b) is a graph showing the spectrum at point A of FIG. 2(a)
Figure 2C:
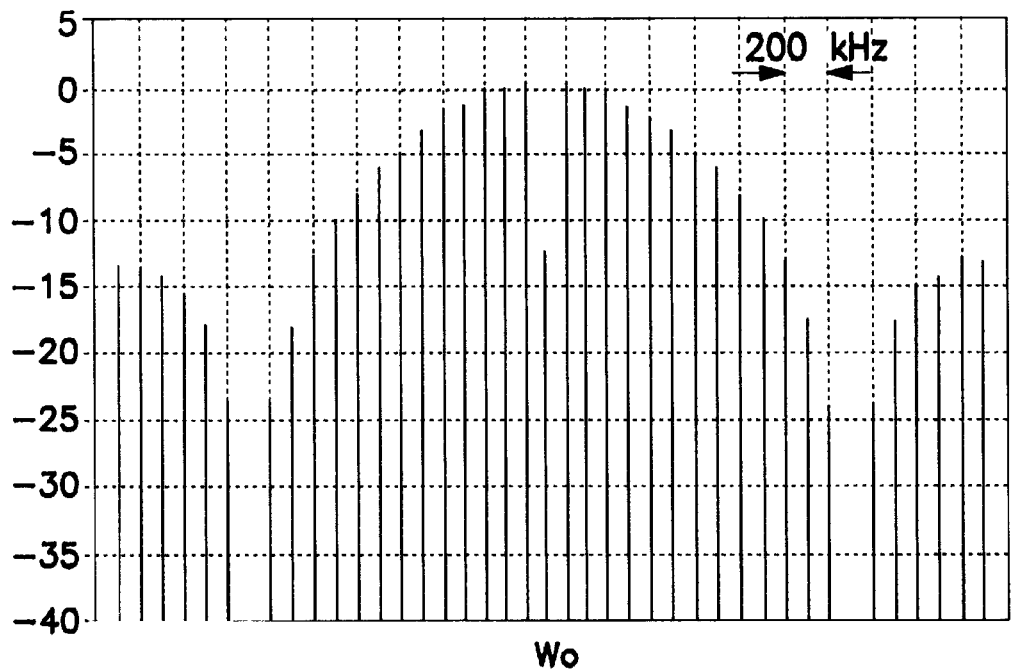
FIG. 2(c) is a graph showing the spectrum at point B of FIG. 2(a)

Multiplication by the carrier shifts the Spectrum of the sequence up to the carrier frequency giving the spectrum at point B of FIG. 2(a) shown in FIG. 2(c). At the edges of the 1.5 MHz band the signal is −3.9 dB relative to the peak.

Figure 2D:
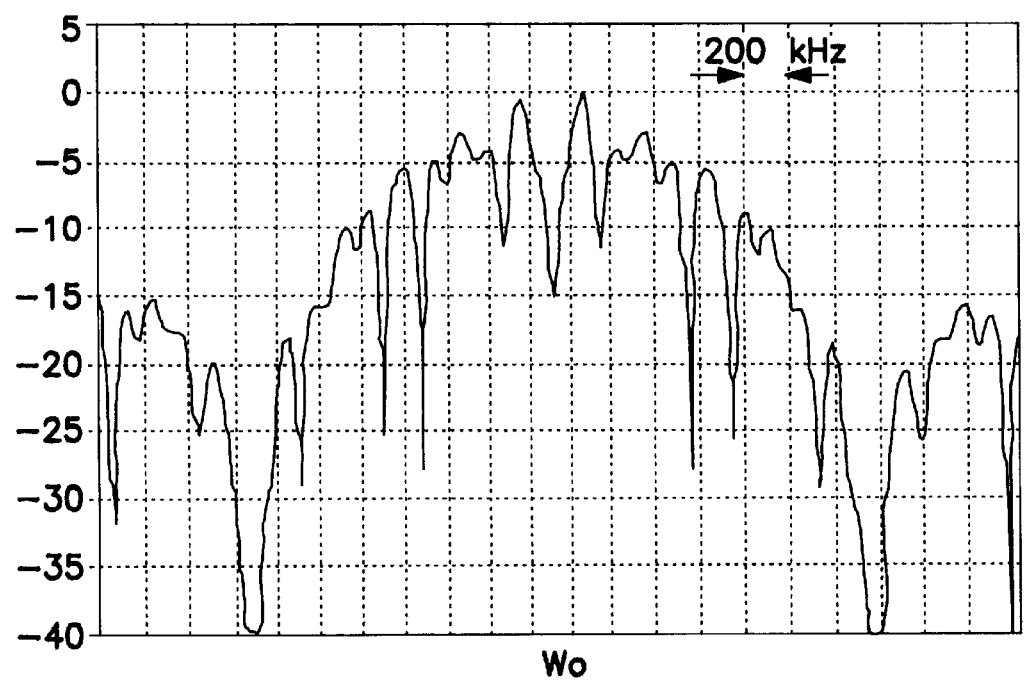
FIG. 2(d) is a graph showing the spectrum at point C of FIG. 2(a)

Applying the random message signal to the spreading waveform fills in the spectrum to give the final transmitted spectrum at point C of FIG. 2(a) shown in FIG. 2(d).

The final signal is much wider than the required 1.5 MHz with sidelobes extending on either side. This can be modified by filtering.

Figure 3:
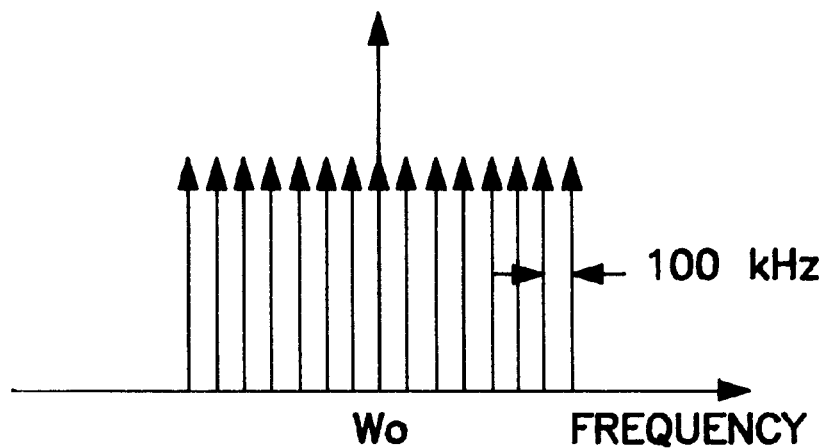
FIG. 3 illustrates a spreading waveform according to one aspect of the present invention.

FCSS Solution: A signal with a period of 10 ms consists of spectral lines spaced at 100 kHz (as seen in FIG. 2(b) for the DS signal). To spread over 1.5 MHz, 15 spectral lines will suffice. A truly band-limited noise-like signal (periodic with period 10 ms), centred on the carrier frequency W0, will have 15 equal (or substantially equal) lines as shown in FIG. 3.

Figure 4A:
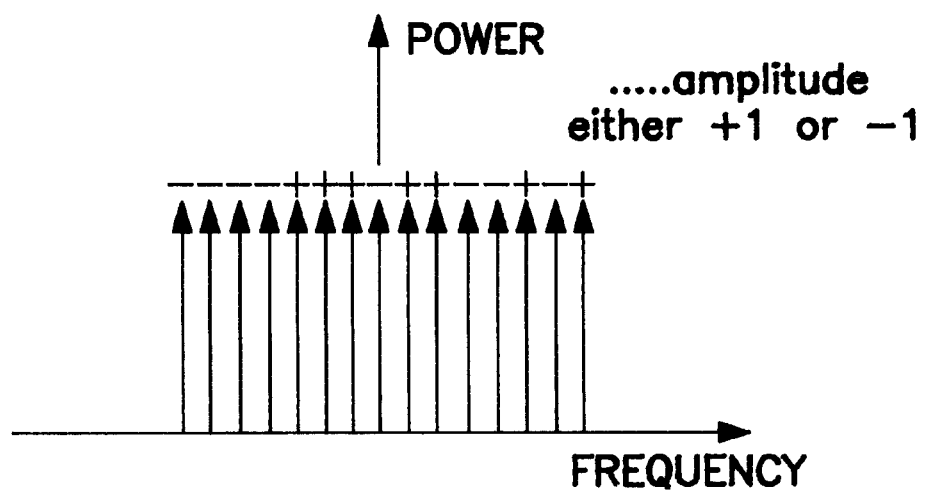
FIG. 4(a) illustrates the transmitted spectrum of a signal according to one aspect of the present invention.
Figure 4B:
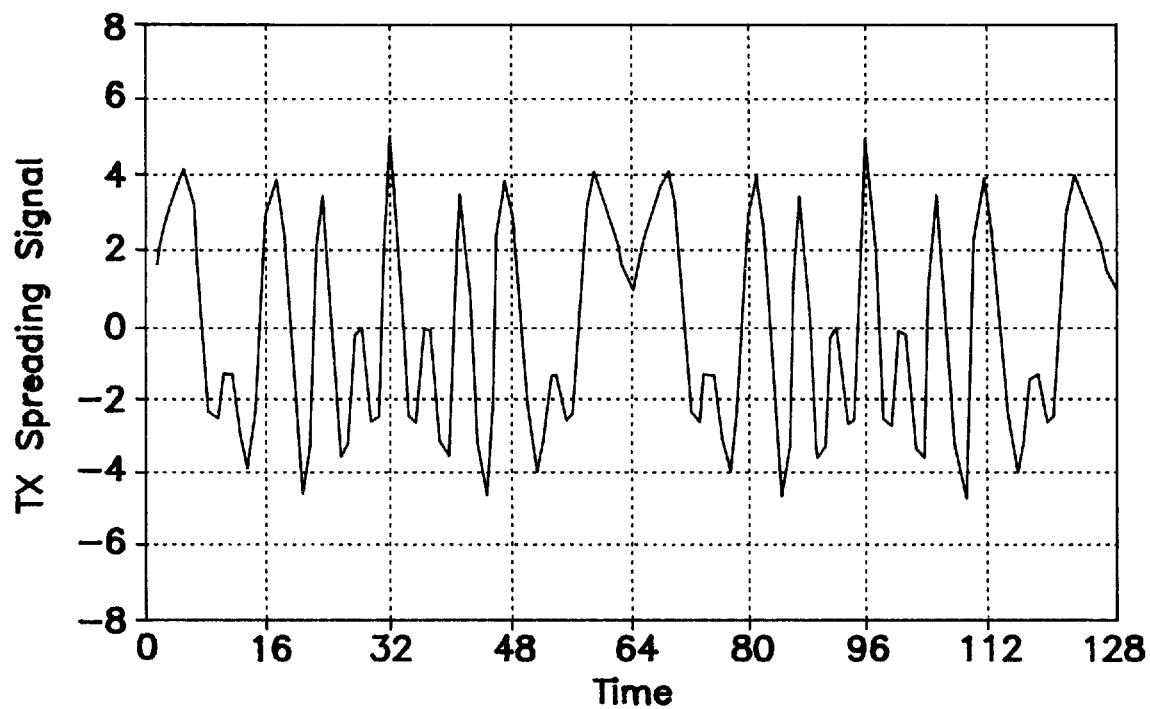
FIG. 4(b) illustrates the in-phase component of a signal with the spectrum shown in FIG. 4(a)

This is the power spectral density of the FCSS signal. To completely define the FCSS signal it is necessary to assign phases to the comb elements. The general FCSS signal is formed by assigning a set of random (or pseudo-random) numbers to the phases. A simple method of assigning random phases is to assign the values of the MLS sequence of length 15 as the comb line amplitudes. This results in all the amplitudes being equal as shown in FIG. 4(a) and the phases are either 0 (for +1) or −180 degrees (for −1). Such a spectrum is shown in FIG. 4(b) along with the corresponding time domain waveform.

FCSS Implementation

Certain implementations will be described below, however, these are illustrative only and should not be considered limitative of the scope of the invention.

(a) Modulator

Figure 5A:
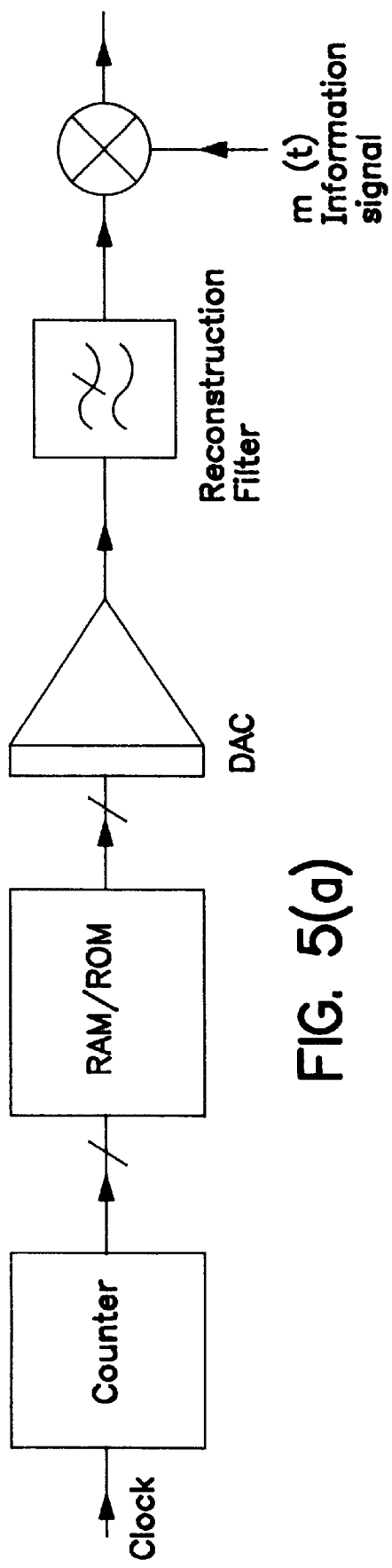
FIG. 5(a) is a schematic block diagram showing a modulator suitable for use according to the present invention.

The FCSS waveform is generated using a RAM look up table driving a DAC as shown in FIG. 5(a). This is the equivalent of the DS system shown in FIG. 2. Samples of the FCSS waveform are stored in the RAM/ROM. They are clocked out successively using the counter and the waveform is then reconstructed (high frequency aliases removed) using the low pass filter shown.

Figure 5B:
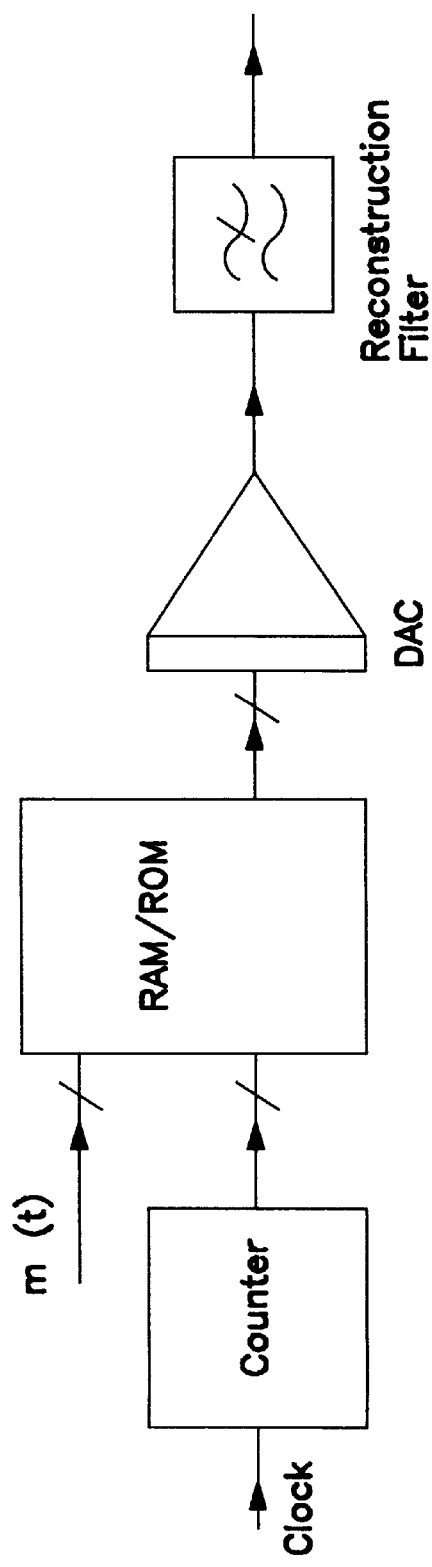
FIG. 5(b) is a schematic block diagram showing another modulator suitable for use according to the present invention.
Figure 5C:
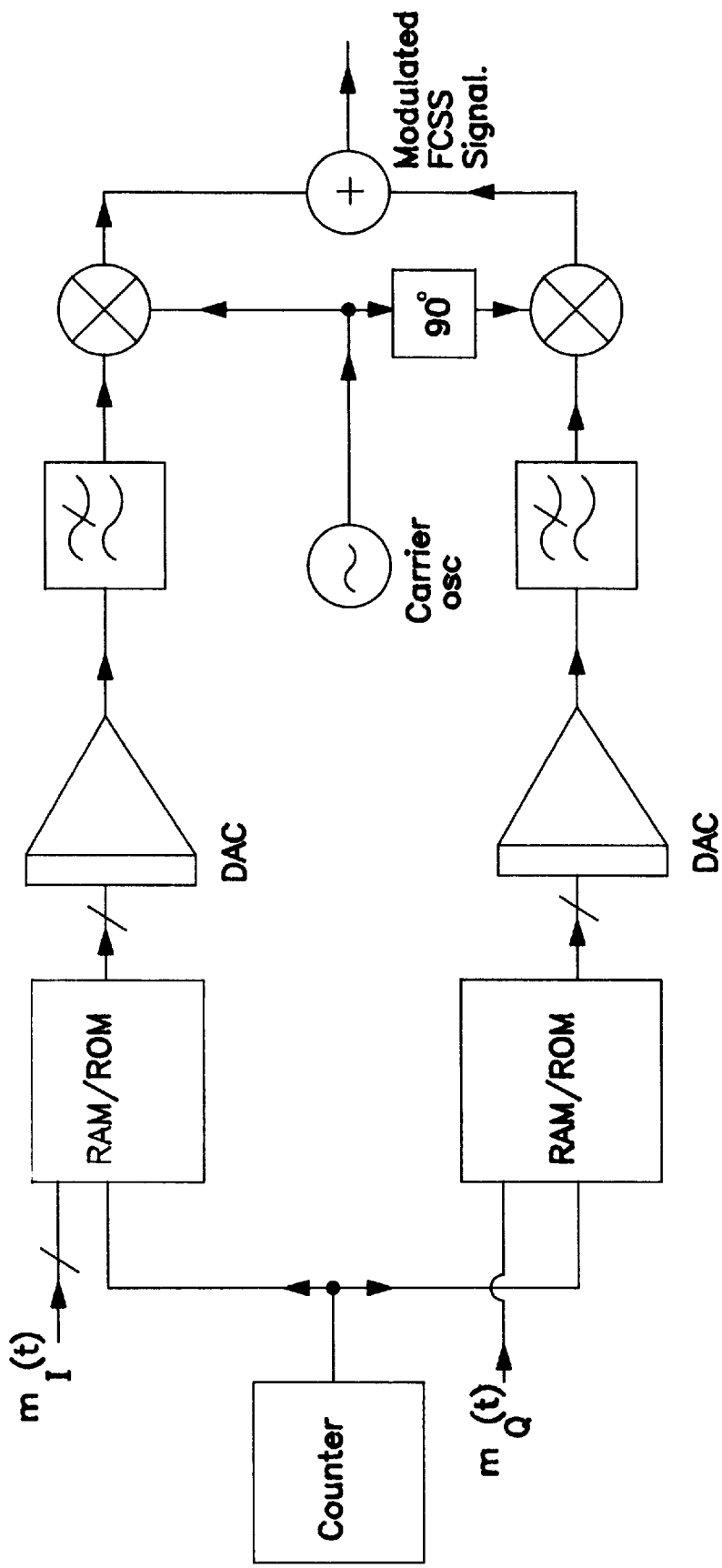
FIG. 5(c) is a schematic block diagram showing a modulator including quadrature suitable for use according to the present invention.

It is possible to perform the multiplication by the message signal m(t) also by reference to look up tables, as is shown in FIG. 5(b). Quadrature modulation or indeed any form of MPSK or QAM can be implemented using this technique, the only restriction being that the look up table must be large enough to store one waveform for each transmitted symbol. This implementation directly generates the FCSS signal centred on the carrier frequency W0. The block diagram for the quadrature modulation system is shown in FIG. 5(c).

(b) Demodulator

Figure 6:
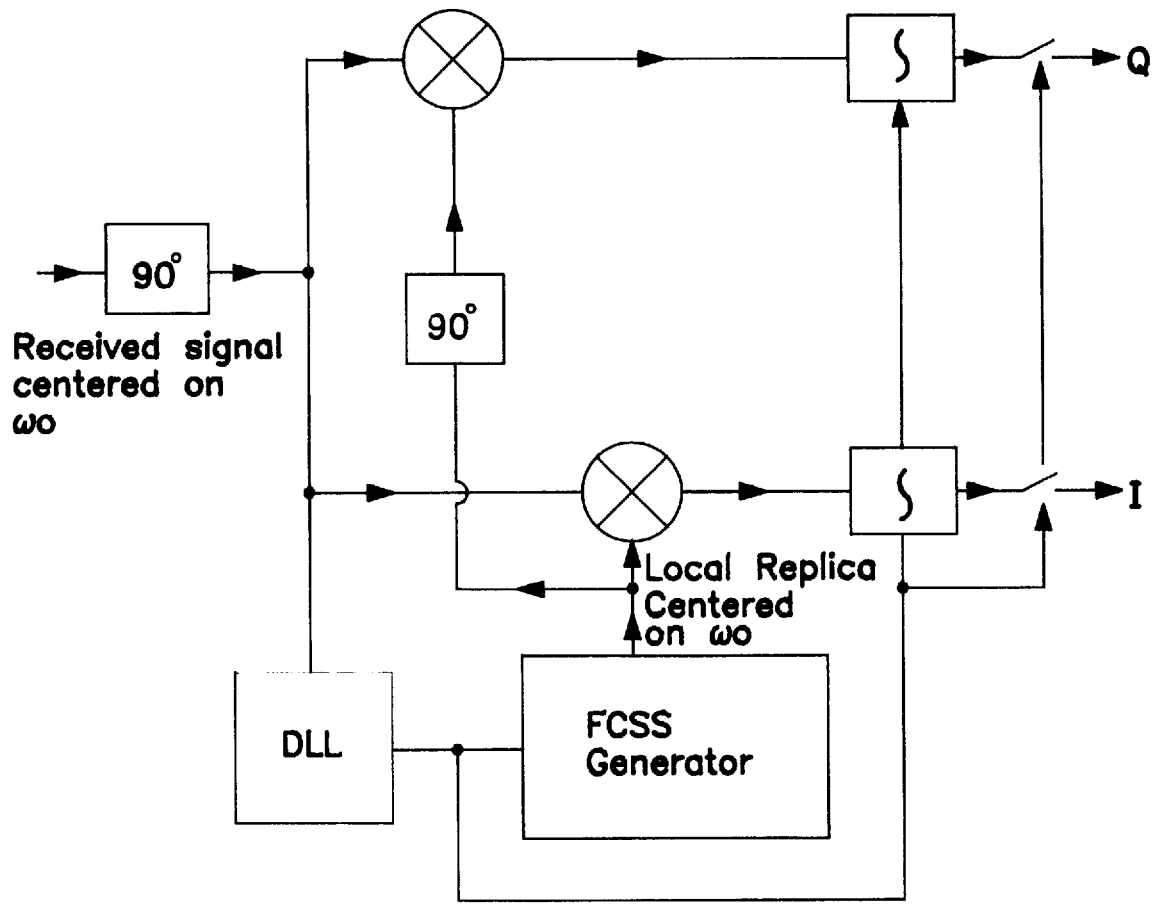
FIG. 6 is a schematic block diagram showing a demodulator suitable for use according to the present invention.

The demodulator for FCSS is similar to a demodulator for DSSS except that the correlating waveform now is not ±1 and hence a full 4-quadrant multiplier is needed as shown in FIG. 6. As for a DS system, the correlating waveform must be synchronised to the received waveform for correct de-spreading. This synchronisation is achieved using a delay locked loop in a similar manner to DS systems. The design of DLL's for FCSS is complicated slightly by the presence of extra false lock positions as the autocorrelation function of the FCSS is significantly different to that from the DS, however standard techniques can be applied to eliminate these.

Once de-spreading has been successfully performed the demodulation of the data can be performed. This is achieved using standard techniques.

Figure 7:
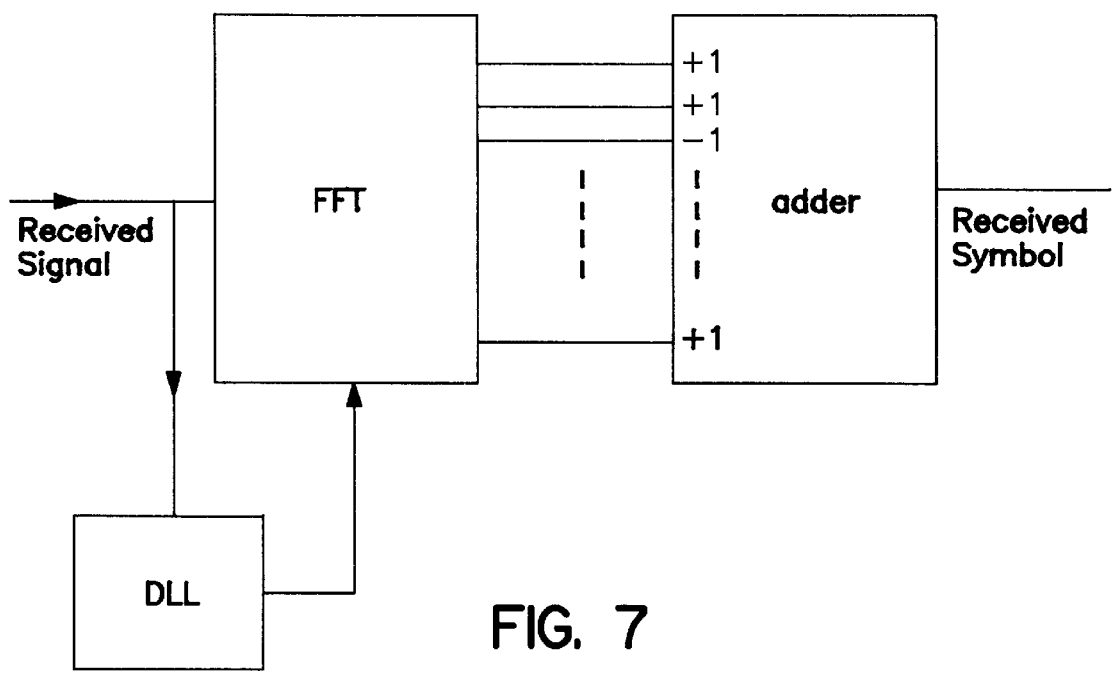
FIG. 7 is a schematic block diagram showing a FFT receiver suitable for use according to the present invention.

As an alternative to correlating in the time domain, the correlation can be performed in the frequency domain using an FFT or other frequency domain processing device as shown in FIG. 7. This system still requires the same synchronization using a DLL or equivalent.

The present invention may also be implemented in a CDMA system.

Sets of spreading waveforms which are orthogonal (or nearly orthogonal) can be constructed using FCSS. One simple technique is to rotate the comb line amplitudes to produce n waveforms for n comb lines. The requirements on the sequence {an} is then that it exhibits low circular autocorrelation values. A MLS is known to have this behavior, however any binary sequence with good autocorrelation properties could be used. The amplitudes of the comb lines for the 15 codes available for our example are shown in FIG. 8(a).

A MLS of length N has autocorrelation values of 1/N away from the maximum. If the codes for CDMA are generated by rotating the {an}, then the cross-correlation to the other codes is 1/N (for a synchronised system).

The codes can easily be made orthogonal by appending either +1 or −1 to each sequence to make the sequence sum to 0 (Hadamard sequence). This requires an additional line appended to the comb. A set of comb amplitudes which will generate 15 orthogonal signals using 16 comb lines is shown in FIG. 8(b).

Figure 9:
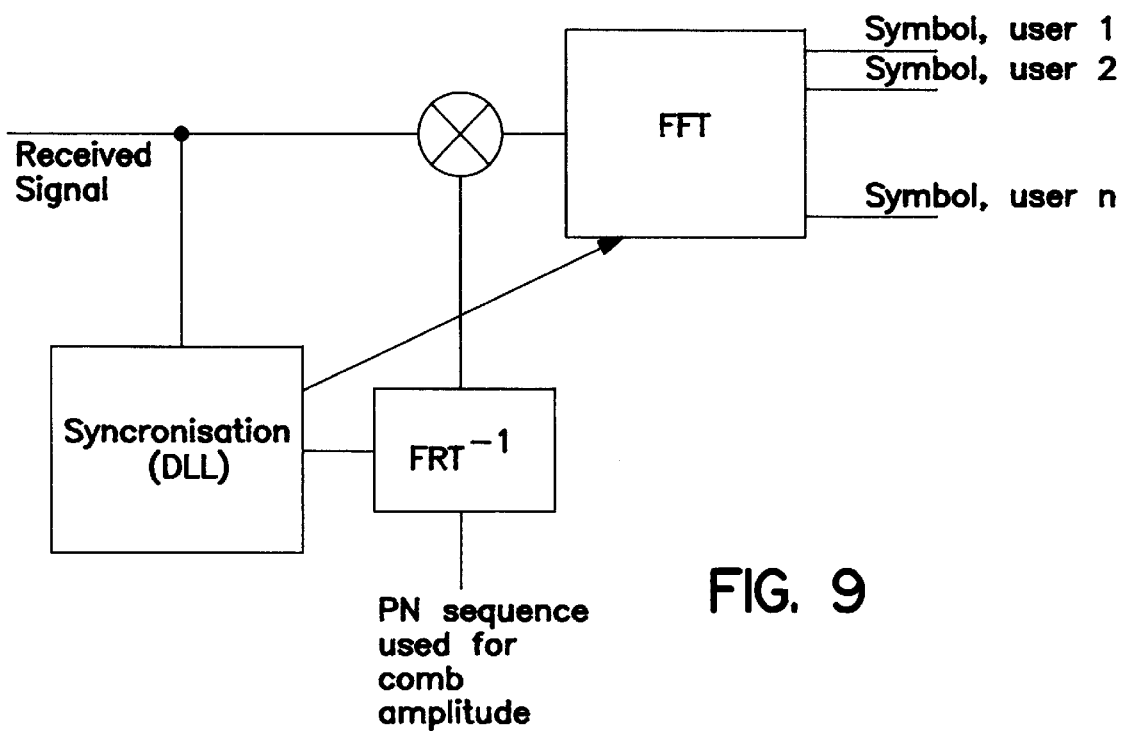
FIG. 9 is a schematic block diagram showing a FFT multi-channel receiver suitable for a CDMA embodiment of the present invention.

Receivers for CDMA are the same as for, single channel operation, however a particularly simple block processing implementation is possible for a multiple channel receiver as shown in FIG. 9.

Another embodiment of the present invention will now be described with reference to the accompanying drawings. It will be appreciated that this example is illustrative only and should not be construed as limitative. The present invention is applicable to the system disclosed above.

Figure 10:
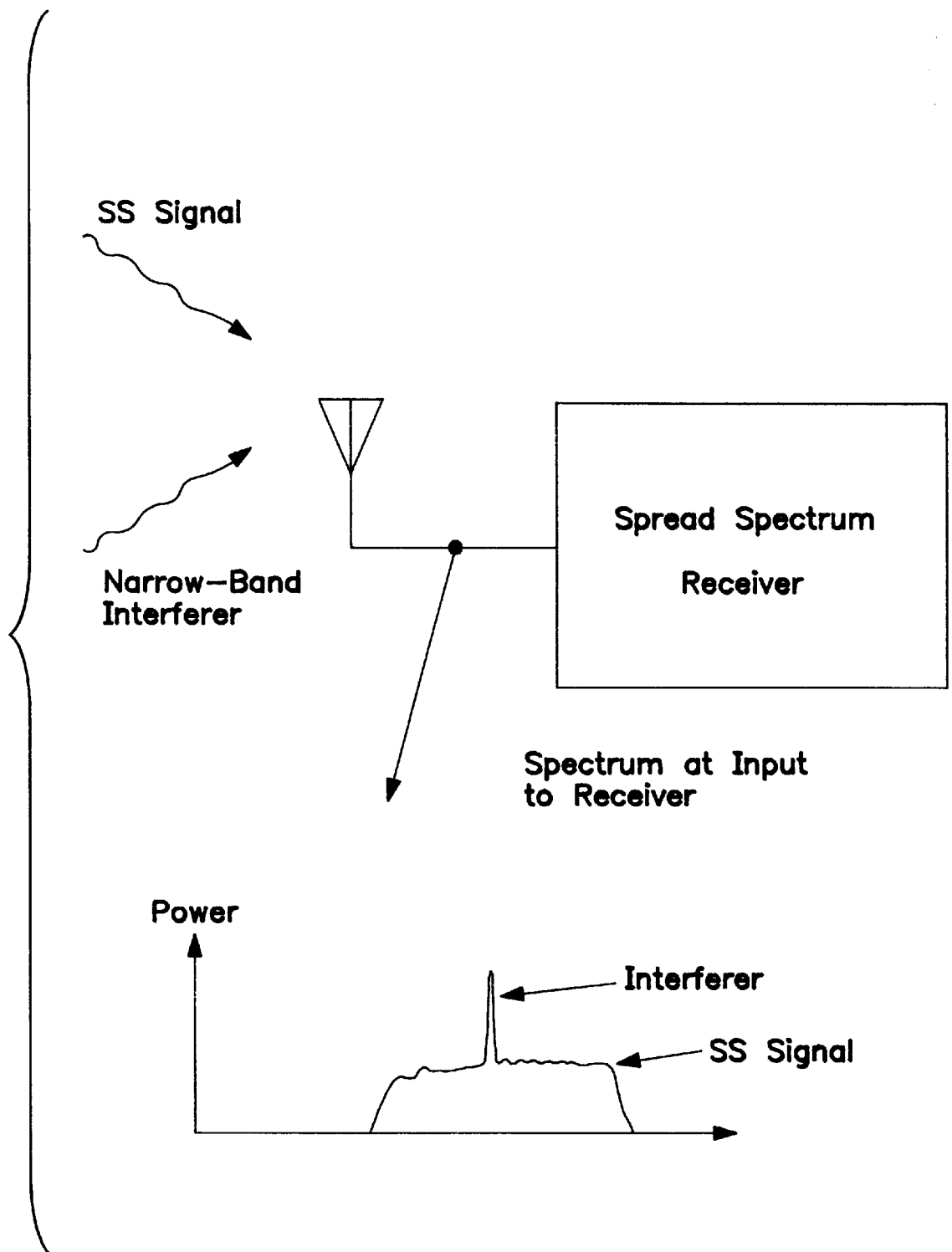
FIG. 10 is a schematic diagram illustrating the problem of narrow band interference.
Figure 11:
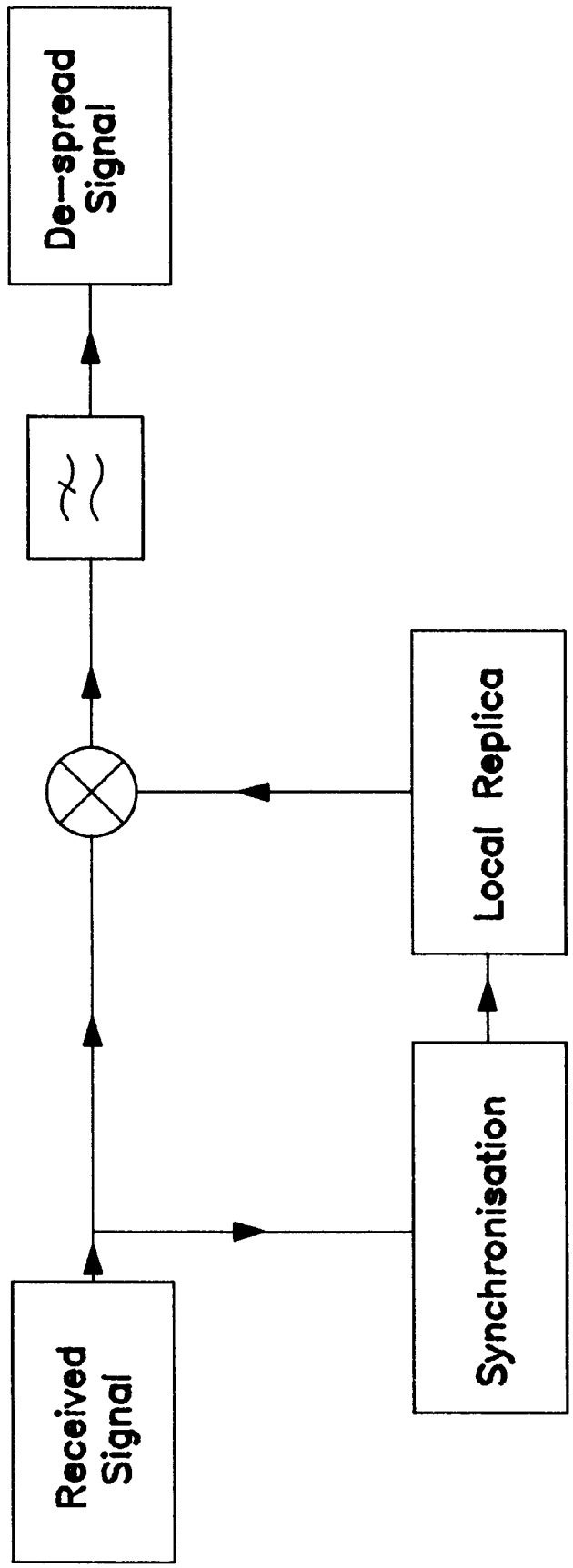
FIG. 11 is a schematic block diagram illustrating de-spreading using a local replica.

The technique according to the present invention is particularly applicable to correlation receivers where the received signal is correlated with a local replica of the transmitted signal. This correlation is performed by multiplying the received signal by the local replica and then integrating over the symbol period or passing the signal through a low-pass filter as shown in FIG. 11. The local replica of the transmitted, signal (the de-spreading signal) has a broad spectrum as shown in FIG. 10.

Figure 12:
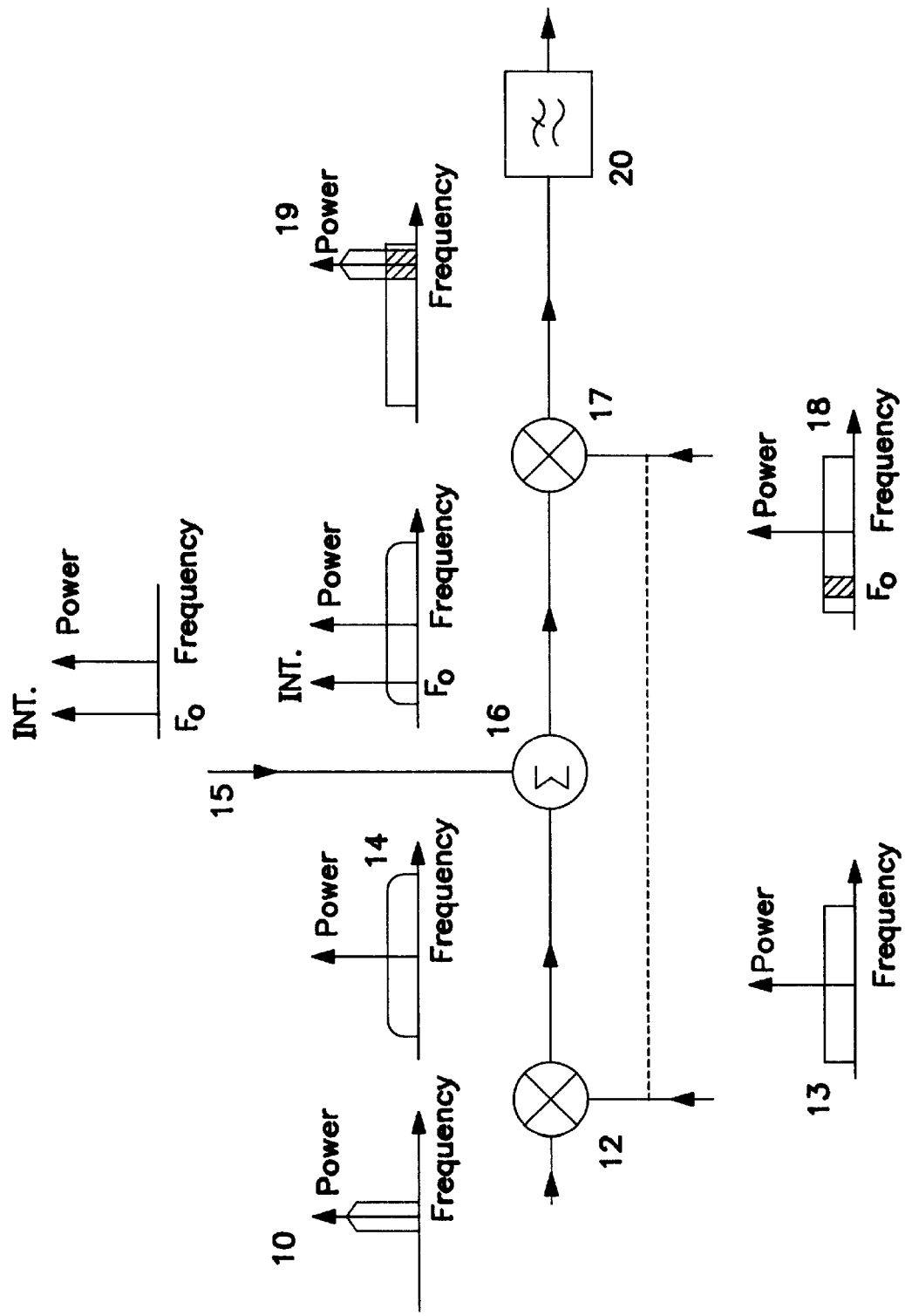
FIG. 12 illustrates the waveforms associated with narrow band interference in a spread spectrum system.

The situation which occurs when an interferer is present is shown in FIG. 12. At the far left, the input signal 10 is shown, which is then multiplied 12 by the spreading waveform 13 to produce a signal 14. Narrow band interference signal 15 is then added 16 to produce a signal which is a composite of the original spread signal and the interferer. When this is multiplied 17 by the de-spreading waveform 18, the signal recovered 19 includes not only the original input signal 10 but also a large noise component. The low pass filter 20 cannot remove the shaded portion, where the signal and interferer are mixed.

Figure 13:
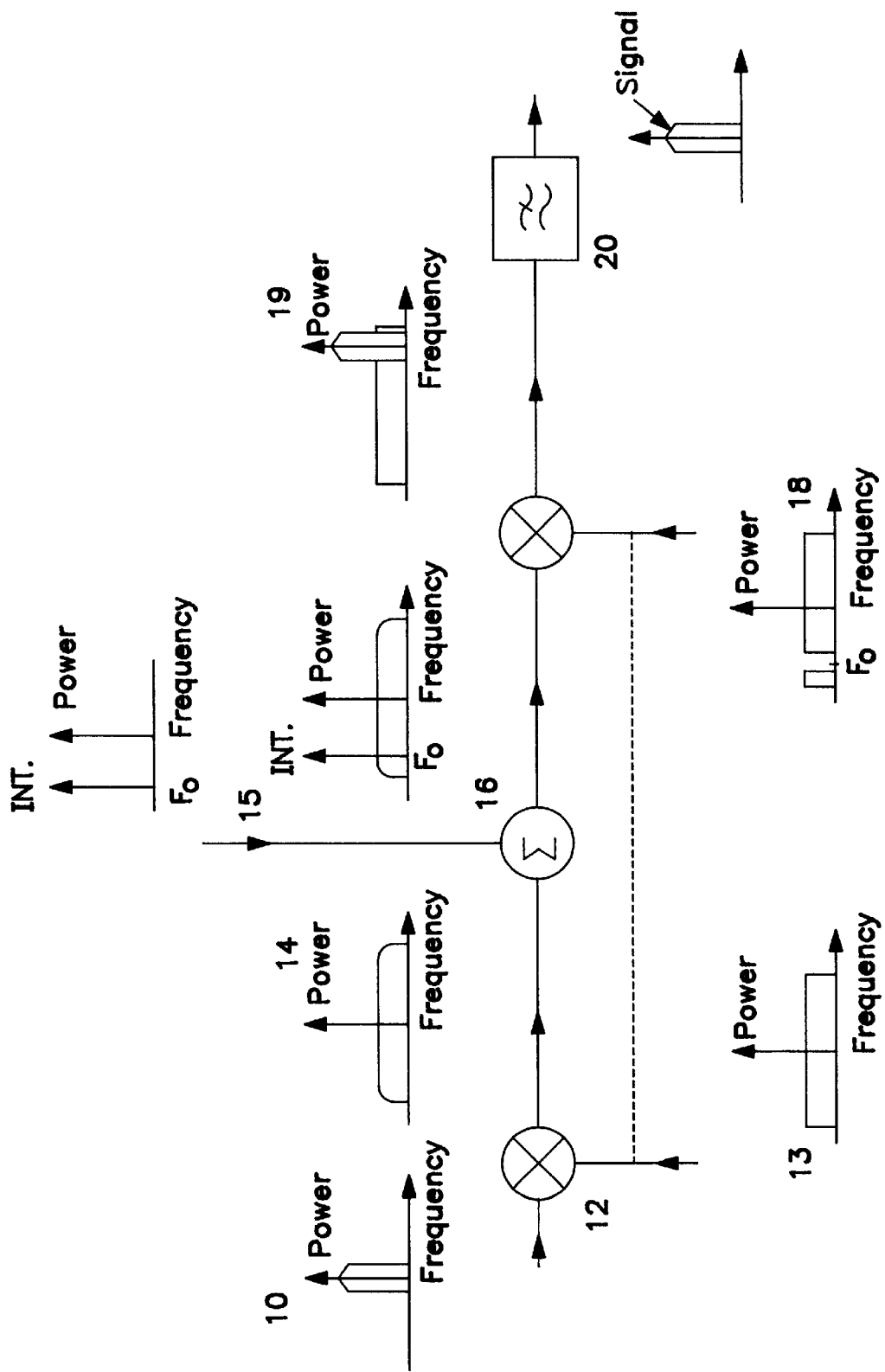
FIG. 13 illustrates the waveform as in FIG. 12 but utilising one embodiment of the present invention.

The important thing to notice here is that the path that allows the interferer to affect the output of the integrators is the signal in the immediate vicinity of the interferer's frequency in the de-spreading signal. If, as is shown in FIG. 13, this part of the de-spreading signal is excised then the effect of the interferer is reduced. A significant improvement in receiver performance may be achieved as the interferer may be reduced by over 20 dB, while the reduction in wanted signal may only be of the order of 0.1 to 0.2 dB.

The modified de-spreading signal is generated using a RAM look up table and a DAC which allows this signal to have an arbitrary spectrum. The practical significance of this technique becomes apparent here whereby it is much easier to generate a signal with an arbitrary spectrum than it is to implement a filter with an arbitrary transfer function as is required in the prior art.

Some method must be provided for the receiver to automatically determine which part of the de-spreading waveform to remove—in other words, to determine where the interference is. There are many methods whereby this could be achieved. The present invention may be implemented using any desired technique. One technique which may be used in the FCSS system is as follows.

The de-spreading signal in the FCSS system consists of N equal amplitude comb lines. The output of the de-spreader consists of the sum of the contributions of the spectrum around each comb line. As the de-spreader is programmable, it is possible to occasionally program in only one line, i.e. the de-spreading waveform is a single comb line (hence the receiver now is a narrow band receiver detecting the energy in the vicinity of one comb line). By checking each comb line successively, narrow band interference is located as a large output on one or more of these lines.

Namely, channels, which are affected by interference, are detected by:

(a) selecting a de-spreading waveform consisting of only one channel of the spreading waveform, (b) multiplying the received signal by said waveform, (c) determining the received de-spread energy corresponding to that channel, (d) repeating steps (a) to (c) until all channels have been sampled, and (e) determining whether any channels have an anomalously high energy, said channel or channels being subject to narrow band interference.

And, the effect of interference is reduced by discarding the parts of the de-spreading waveform corresponding, to this channel or channels in which interference is present, so as to form a modified de-spreading waveform, and de-spreading the received signal using the modified de-spreading waveform.

Figure 14:
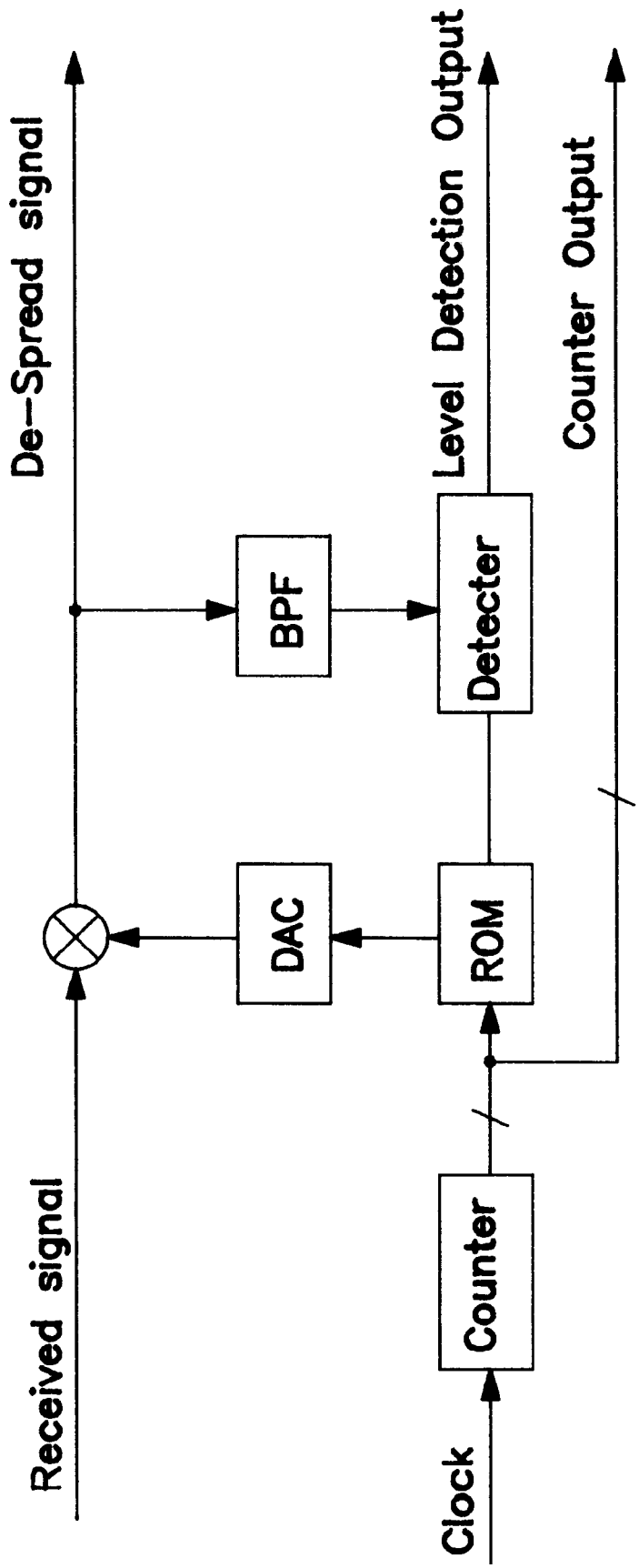
FIG. 14 is a schematic block diagram showing a demodulator according to another aspect of the present invention.

FIG. 14 shows an embodiment for detecting a channel (A spread spectrum signal in wide band is regarded as a signal (FCSS signal) gathering a plurality of signals having small frequency width, and such small frequency width is called "channel".) in the spread spectrum signal interfered by a narrow band signal.

A receiving signal is multiplied in a multiplier with a de-spreading waveform generated by ROM structuring a look up table. Such ROM outputs a predetermined digital value, an address of ROM being obtained by decoding the number of clocks of a receiver counted by a counter. Then, the digital value is converted to an analog waveform by a DAC converter to be sent to the multiplier.

In such structure, DAC outputs a waveform so that one of the channels can enter into a band of a narrow band pass filter (BPF). In other words, a look up table is set so as to make another channel enter into the narrow band pass filter (BPF) when an address changes in accordance with the increase of the clock, and further to make the rest of the channels drop into the narrow band pass filter (BPF) in sequence. The output from the narrow band pass filter (BPF) is detected by a detector, and its level is outputted as a level detection signal.

A counter output and a level detection signal output can be obtained as outputs at the same time. The level detection signals corresponding to each of the channels are to be almost equal. But, when there is a level detection signal extremely big, a channel having interference can be specified from the counter outputs. Therefore, de-spreading outputs comprising no interference wave can be obtained by adjusting the address of ROM so that the specified channel should not be outputted.

In operation, a short period of transmission time may be allocated on a regular basis to be used for checking the 'uniformity' of the contributions from each comb line, and any comb lines which are found to be significantly larger than the others are assumed to be suffering interference and are removed from the composite de-spreading sequence.

Preferably, regular testing is conducted to check for loss of old interference sources, and commencement of new ones. This procedure may result in the removed lines being re-inserted if the interference stops.

It will be appreciated that variations and additions are possible within the spirit and scope of the invention.

I claim:

1. A spread spectrum transmitter method, comprising the steps of:
   forming a spreading signal comprising a plurality of component signals, each of said component signals being phase encoded by a different element of a spreading code sequence, being spaced apart equally in frequency and being substantially equal in amplitude; and
   spreading an input signal in accordance with said spreading signal.

2. A spread spectrum transmitter method according to claim 1, wherein said spreading signal is formed by reference to a look up table.

3. A spread spectrum transmitter method according to claim 1, wherein a phase of each said component signal is assigned by reference to a random or pseudo-random sequence.

4. A spread spectrum transmitter method according to claim 1, wherein each of said component signals is phase encoded by the same input signal and each of a plurality of elements in the code sequence.

5. A spread spectrum CDMA modulation system, comprising:
   means for inputting an input signal; and
   means for modulating the input signal by providing at least one spreading signal comprised of a set of orthogonal or near-orthogonal signals, each of said orthogonal or near-orthogonal signals comprising a plurality of component signals spaced apart equally in frequency and having substantially equal amplitudes, wherein each said component signal is phase encoded by a different element of a spreading code sequence.

6. A spread spectrum CDMA nodulation system according to claim 5, wherein each of said component signals is phase encoded by the same input signal and each of a plurality of elements in the code sequence.

7. A method for reducing the effect of interference in a spread spectrum system, comprising the steps of:
   detecting in a received spread spectrum signal a channel or channels in which interference is present;
   discarding parts of a de-spreading signal corresponding to the channel or channels, so as to form a modified de-spreading waveform, said de-spreading signal being encoded by a spreading code sequence; and
   de-spreading a received spread spectrum signal using the modified de-spreading waveform.

8. A method according to claim 7, wherein the de-spreading signal is generated with reference to a look up table.

9. A method according to claim 7, wherein said received spread spectrum signal is transmitted through a plurality of channels.

10. A method of detecting channels which are affected by interference in a spread spectrum communications system, wherein a receiver is of the type utilizing a look up table to generate de-spreading waveforms, comprising the steps of:
    (a) selecting a de-spreading waveform consisting of only one channel of a spreading waveform;
    (b) multiplying a received signal by said waveform;
    (c) determining received de-spread energy corresponding to the one channel;
    (d) repeating steps (a) to (c) until all channels have been sampled;
    (e) determining whether any channels have an anomalously high energy, said one channel or channels being subject to narrow band interference.

11. A method according to claim 10, wherein said received spread spectrum signal is transmitted through a plurality of channels.

12. A spread spectrum modulation system, comprising means for inputting an input signal and means for providing a spreading signal, wherein the input signal is modulated by the spreading signal, said spreading signal comprising a plurality of component signals having different frequencies and substantially equal amplitudes, wherein each of said component signals is phase encoded by a different element of a spreading code sequence.

13. A spread spectrum modulation system according to claim 12 wherein each said component signal is phase encoded by having a phase thereof assigned by a random or pseudo-random number generator.

14. A spread spectrum modulation system according to claim 12 wherein each said component signal is phase encoded by reference to a look-up table.

15. A spread spectrum modulation system according to claim 12, wherein each of said component signals is phase encoded by the same input signal and each of a plurality of elements in the code sequence.

16. A spread spectrum transmitter method, comprising the steps of:
    forming a spreading signal comprising a plurality of component signals, each of the plurality of component signals being phase encoded by a different element of a spreading code sequence, said component signals having different frequencies and substantially equal amplitudes; and
    spreading an input signal with said spreading signal.

17. A spread spectrum transmitter method according to claim 16 wherein said spreading signal is formed by reference to a look-up table.

18. A spread spectrum transmitter method according to claim 16 wherein a phase of each said component signal is assigned by reference to a random or pseudo-random sequence.

19. A spread spectrum transmitter method according to claim 16, wherein each of said component signals is phase encoded by the same input signal and each of a plurality of elements in the code sequence.

20. A spread spectrum CDMA modulation system comprising:

means for inputting an input signal; and means for modulating the input signal by providing at least one spreading signal comprised of a set of orthogonal or near-orthogonal signals, each said orthogonal or near-orthogonal signals comprising a plurality of component signals having different frequencies and substantially equal amplitudes, wherein each said component signal is phase encoded by a different element of a spreading code sequence.

21. A spread spectrum CDMA nodulation system according to claim 20, wherein each of said component signals is phase encoded by the same input signal and each of a plurality of elements in the code sequence.

22. A method of detecting channels which are affected by interference in a spread spectrum communications system, wherein a receiver is of the type utilizing a look up table to generate de-spreading waveforms, comprising the steps of:

(a) selecting a de-spreading waveform consisting of only one channel of a spreading waveform;

(b) multiplying a received signal by said waveform;

(c) determining received de-spread energy corresponding to the one channel;

(d) repeating steps (a) to (c) until all channels have been sampled;

(e) determining whether any channels have an anomalously high energy, said one channel or channels being subject to narrow band interference; and (f) de-spreading channels other than said one channel or channels being subject to the narrow band interference using a spreading code sequence.

23. A spread spectrum modulation system in which a spreading code sequence is used for generating a spread spectrum comprising several component signals, comprising:

input means for inputting the input signal; and a modulator connected to said input means and constructed to receive the input signal and to modulate several spread spectrum component signals by the input signal, each of said component signals having the same amplitude, the frequency of each component signal being different from the frequency of its next adjacent component signal by the same amount, and each of the component signals being phase encoded by a different element of the spreading code sequence: wherein the different element of the spreading code is predetermined independently from the input signal.

24. A spread spectrum modulation system according to claim 23, wherein each said component signal is phase encoded by having a phase thereof assigned by a random or pseudo-random number generator.

25. A spread spectrum modulation system according to claim 23, wherein each said component signal is chase encoded by reference to a look-up table.

26. A spread spectrum modulation system according to claim 23, wherein each of said component signals is phase encoded by the same input signal and each of a plurality of elements in the code sequence.

* * * * *

UNITED STATES PATENT AND TRADEMARK OFFICE
CERTIFICATE OF CORRECTION

PATENT NO. : 6,023,488
DATED : February 8, 2000
INVENTOR(S) : Peter John White

Page 1 of 1

It is certified that error appears in the above-identified patent and that said Letters Patent is hereby corrected as shown below:

Column 10,
Line 31, "chase" should read -- phase --.

Signed and Sealed this

Fifth Day of February, 2002

Attest:

Attesting Officer

JAMES E. ROGAN
Director of the United States Patent and Trademark Office